US006875902B2

(12) United States Patent
Hori et al.

(10) Patent No.: US 6,875,902 B2
(45) Date of Patent: Apr. 5, 2005

(54) METHOD DECOMPOSING FLUORINE-CONTAINING ORGANIC MATERIAL

(75) Inventors: Hisao Hori, Tsuchiura (JP); Hisahiro Einaga, Tsukuba (JP)

(73) Assignee: National Institute of Advanced Industrial Science and Technology (JP)

( * ) Notice: Subject to any disclaimer, the term of this patent is extended or adjusted under 35 U.S.C. 154(b) by 210 days.

(21) Appl. No.: 10/288,371

(22) Filed: Nov. 6, 2002

(65) Prior Publication Data

US 2004/0084296 A1 May 6, 2004

(51) Int. Cl.[7] .............................. A62D 3/00; C07F 1/00
(52) U.S. Cl. ..................................... 588/212; 204/157.6
(58) Field of Search ......................... 204/157.6; 588/212

(56) References Cited

U.S. PATENT DOCUMENTS 6,203,671 B1 * 3/2001 Demmin ................ 204/157.94

OTHER PUBLICATIONS

Minero et al., "Reactions of Hexafluorobenzene and Pentafluorophenol Catalyzed by Irradiated TiO2 in Aqueous Solutions", Langmuir, vol. 10, No. 3 (no month, 1994), pp. 692–698.*

* cited by examiner

Primary Examiner—Edna Wong
(74) Attorney, Agent, or Firm—Lorusso, Loud & Kelly

(57) ABSTRACT

A method of decomposing a fluorine-containing organic material, which includes irradiating a mixture of an aqueous phase containing a photocatalyst with the fluorine-containing organic material with light in the presence of an oxygen source. The fluorine-containing organic material may be contained in a carbon dioxide phase such that the aqueous phase and the carbon dioxide phase are mixed with each other with stirring to form a mixed phase which is irradiated with the light.

11 Claims, 2 Drawing Sheets

METHOD DECOMPOSING FLUORINE-CONTAINING ORGANIC MATERIAL

BACKGROUND OF THE INVENTION

This invention relates to a method of decomposing a fluorine-containing organic material.

Fluorine-containing organic materials which are now widely utilized in a variety of applications are not delivered from problems of environmental pollution. There are reports that the concentration of trifluoroacetic acid in the atmosphere gradually increases year by year and that perfluorooctanesulfonic acid is harmful to human bodies. High molecular weight fluorine-containing organic materials are also likely to cause environmental problems.

Thus, there is a strong demand for decomposing fluorine-containing organic materials without releasing them into the environment. One known method of decomposing halogen-containing organic materials uses plasma destruction in which the material is decomposed in a high-frequency plasma having a temperature higher than 10,000° C. in the presence of water. Another method is a supercritical hydrolysis in which the material is hydrolyzed by supercritical water at high temperature and pressure. A further method is a catalytic process in which the material is contacted with a catalyst at a high temperature. A pyrolysis method is further known in which the material is directly thermally decomposed. The known methods are not satisfactory and cannot effectively break carbon-fluorine bonds of fluorine-containing organic materials.

SUMMARY OF THE INVENTION

It is, therefore, an object of the present invention to provide a method which can effectively decompose fluorine-containing organic materials.

Another object of the present invention is to provide a method which can cleave carbon-fluorine bonds of fluorine-containing organic materials to form fluorine ions which may be converted into a harmless state.

It is a further object of the present invention to provide a method which can effectively decompose water soluble fluorine-containing organic materials.

It is yet a further object of the present invention to provide a method which can effectively decompose a high molecular weight fluorine-containing organic materials at a relatively low temperature.

In accomplishing the foregoing objects, there is provided in accordance with the present invention a method of decomposing a fluorine-containing organic material, comprising irradiating a mixture of an aqueous phase containing a photocatalyst with the fluorine-containing organic material with light in the presence of an oxygen source.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

Figure 1:
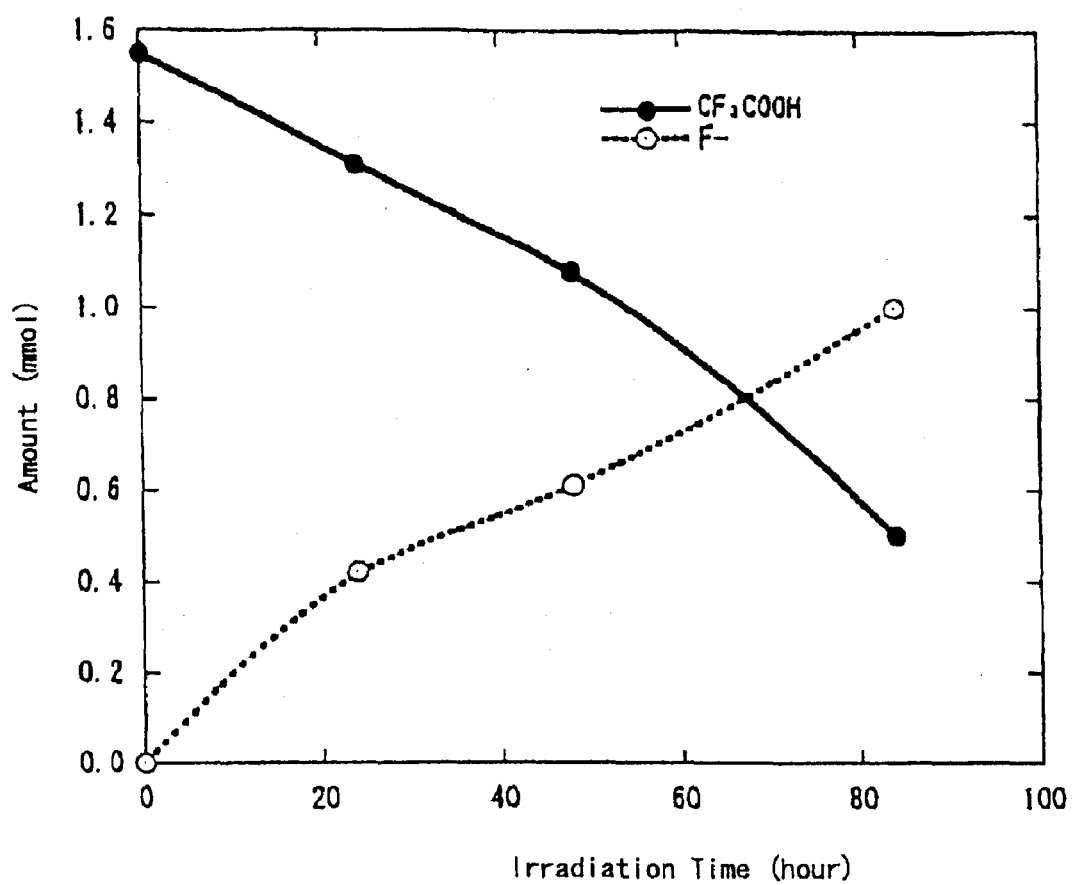
FIG. 1 is a graph showing change of concentration of trifluoroacetic acid and concentration of fluorides with irradiation time measured in Example 1.

According to a method of the present invention, a mixture of an aqueous phase containing a photocatalyst with a fluorine-containing organic material is irradiated with light in the presence of an oxygen source.

The wavelength of the light used for irradiation of the above mixture depends upon the photocatalyst employed, but is generally in the range of 200 to 800 nm, preferably 250 to 400 nm. The irradiation is performed for a period of time sufficient to decompose fluorine-containing organic material. Any known light source, such as a mercury lamp, a xenon lamp, a deuterium lamp or sun light, may be suitably used.

The photocatalyst is a metal compound, such as a metal oxide (e.g. titanium oxide), a complex metal oxide or a metal complex, and is preferably a water soluble metal complex showing an absorption band, attributed to charge transference between the metal and the ligand thereof, at a UV to visible light region. It is also preferable to use as the photocatalyst a hetero polyacid represented by the following formula:

wherein

A is a counter ion such as proton, ammonium ion, a metal ion (such as alkali metal ion (e.g. lithium, sodium, potassium, rubidium, or cesium ion) or alkaline earth metal ion (e.g. magnesium or calcium ion);

D is phosphorus, boron, silicon, germanium, tin, arsenic, antimony, copper, nickel, cobalt, iron, cerium, thorium, chromium or a combination of at least two of these elements;

M is molybdenum, tungsten, vanadium, titanium, aluminum, niobium, tantalum or a combination of at least two of these elements;

p is a number at least 1;

y is a number from 0.1 to 10;

x is a number from 6 to 18; and q is the number of oxygen atoms in the heteropolyacid and is a number from 10 to 70. The heteropolyacid having water of crystallization may be also used.

Illustrative of suitable heteropolyacids are $H_3PW_{12}O_{40} \cdot 6H_2O$, $H_6P_2W_{18}O_{62}$, $H_4SiW_{12}O_{40}$, $H_5PMo_{10}V_2O_{40}$ and $H_3PMo_{12}O_{40}$. Since the heteropolyacids are strong acid, the inside wall of a reactor in which the decomposition is carried out is preferably made of an acid-resisting material such as alumina, Inconel or Hasteloy. If desired, the photocatalyst may be supported on a suitable carrier such as molecular sieves.

In performing the decomposition, the photocatalyst is contained, preferably dissolved, in an aqueous phase. The concentration of the photocatalyst in the aqueous phase is generally 0.0001 to 100 mol/L, preferably 0.001 to 10 mol/L.

The fluorine-containing organic material to be treated by the method of the present invention includes a wide range of fluorine-containing organic compounds and polymers.

In the first aspect of the present invention, the fluorine-containing organic material is a fluorine-containing compound which is soluble in water or which forms a colloid in water. Preferably, the fluorine-containing organic material is a water-soluble compound having 1 to 5 carbon atoms. Examples of the water-soluble fluorine-containing compound include fluoroalkylcarboxylic acids, fluoroalkylsulfonic acids, fluoroalcohols and mixtures thereof.

The fluorine-containing compound is mixed with an aqueous phase containing a photocatalyst and the mixture is irradiated with light in the presence of a source of oxygen such as oxygen gas or a peroxide (e.g. hydrogen peroxide). The amount of the fluorine-containing compound is generally 1 to 10,000 moles, preferably 1 to 50 moles, per mole of the photocatalyst. When the oxygen source is oxygen gas, the oxygen gas may be bubbled through the mixture (or solution) of the aqueous phase and the fluorine-containing compound. Alternatively, the oxygen gas may be charged in a reactor containing the mixture (or solution) of the aqueous phase and the fluorine-containing compound to a pressure of, for example, up to 1 MPa. The irradiation time depends on the kind of the photocatalyst employed, the kind and concentration of the fluorine-containing organic compound, the intensity of the light, etc., but is generally in the range of 1 hour to 10 days. The decomposition is performed at a temperature of 15 to 90° C., preferably 25 to 50° C., under a pressure of 0.1 to 30 MPa, preferably 0.5 to 20 MPa.

In the second aspect of the present invention, the fluorine-containing organic material is a water-insoluble compound such as a high molecular weight substance having a molecular weight of at least 400. Examples of the high molecular weight substance include fluoroalkylcarboxylic acids, fluoroalkylsulfonic acids, fluoroalcohols, poly(tetrafluoroethylene), fluorovinylidene-trifluorochloroethylene copolymers, fluorovinylidene-hexafluoropropylene copolymers, tetrafluoroethylene-hexafluoropropylene copolymers and other fluororubbers.

Preferably, the water-insoluble fluorine-containing substance is contained in a carbon dioxide phase which is in a liquid or supercritical state. The carbon dioxide phase containing the water-insoluble substance is mixed with the aqueous phase containing the photocatalyst with stirring to form a mixed phase which is irradiated with the light in the presence of a source of oxygen such as oxygen gas or a peroxide (e.g. hydrogen peroxide). The amount of the fluorine-containing water-insoluble substance is generally 2 to 10,000 moles, preferably 5 to 100 moles, per mole of the photocatalyst. When the oxygen source is oxygen gas, the oxygen gas may be bubbled through the mixed phase. Alternatively, the oxygen gas may be charged in a reactor containing the mixed phase to a pressure of, for example, up to 1 MPa. The irradiation time depends on the kind of the photocatalyst employed, the kind and concentration of the fluorine-containing water-insoluble substance, the intensity of the light, etc., but is generally in the range of 1 hour to 5 days. The decomposition is performed at a temperature of 20 to 90° C., preferably 25 to 80° C., under a pressure of 6 to 30 MPa, preferably 10 to 20 MPa.

It is preferred that an organic solvent such as acetonitrile be added in the reaction mixture to facilitate material transfer between the aqueous phase and the carbon dioxide phase. Since the fluorine-containing water-insoluble substance tends to be partly or completely dissolved or swollen in the carbon dioxide phase, the photocatalyst can be sufficiently contacted with the substance so that the decomposition thereof is accelerated.

As a result of the above treatment, the fluorine-containing organic material is decomposed to form fluorine ions. The aqueous phase containing the fluorine ions may be contacted with a calcium ion source such as calcium nitrate to precipitate the fluorine ions as calcium fluoride. The calcium fluoride may be recovered and utilized for the preparation of, for example, construction materials such as boards.

The following examples will further illustrate the present invention.

EXAMPLE 1

In a 200 mL pressure-resistant reactor having a sapphire window and lined with an alumina coating, $1.55 \times 10^{-4}$ mole of $H_3PW_{12}O_{40} \cdot 6H_2O$, $1.55 \times 10^{-3}$ mole of trifluoroacetic acid and 23 mL of water were placed, into which oxygen gas was fed until an inside pressure of 0.5 MPa was reached. With stirring using a magnetic stirrer, the mixture in the reactor was irradiated through the window with light of wavelengths of at least 250 nm from a high pressure mercury lamp at 25° C. for 85 hours. After 24, 48 and 85 hours from the commencement of the irradiation, the reaction mixture was sampled to measure the residual amount of trifluoroacetic acid by an ion-exclusion chromatography technique and the amount of fluorides produced by an ion chromatography technique. The results are shown by graphs in FIG. 1. About 65% of the trifluoroacetic acid was found to be decomposed 85 hours after the start of the irradiation.

COMPARATIVE EXAMPLE 1

The procedure of Example 1 was repeated in the same manner as described except that no photocatalyst was used. Decomposition of trifluoroacetic acid did not occur.

EXAMPLE 2

In a 300 mL pressure-resistant reactor having a sapphire window and lined with an alumina coating, $2 \times 10^{-4}$ mole of $H_3PW_{12}O_{40} \cdot 6H_2O$ as a photocatalyst and 20 mL of water were placed, while $2 \times 10^{-3}$ mole of perfluorooctanecarboxylic acid ($C_8F_{17}COOH$) powder was charged in a holder provided in an upper portion of the inside of the reactor. Carbon dioxide (140 g) was then added into the reactor so that the inside pressure in the vessel was 5.7 MPa at 20° C. Oxygen gas was then fed to the reactor until a total pressure of 6.2 MPa was reached inside the reactor. The perfluorooctanecarboxylic acid in the holder was added into the aqueous solution and, with stirring using a magnetic stirrer, the mixture in the reactor was heated to 40° C. so that the pressure was increased to 9.8 MPa. Then, the mixture was irradiated through the window with light of wavelengths of at least 250 nm from a high pressure mercury lamp for 24 hours. After 4, 8, 12, 16, 20 and 24 hours from the commencement of the irradiation, the reaction mixture was sampled to measure the residual amount of the perfluorooctanecarboxylic acid by an ion-exclusion chromatography technique. The results are shown by a graph in FIG. 2. About 55% of the perfluorooctanecarboxylic acid was found to be decomposed 24 hours after the start of the irradiation.

COMPARATIVE EXAMPLE 2

Figure 2:
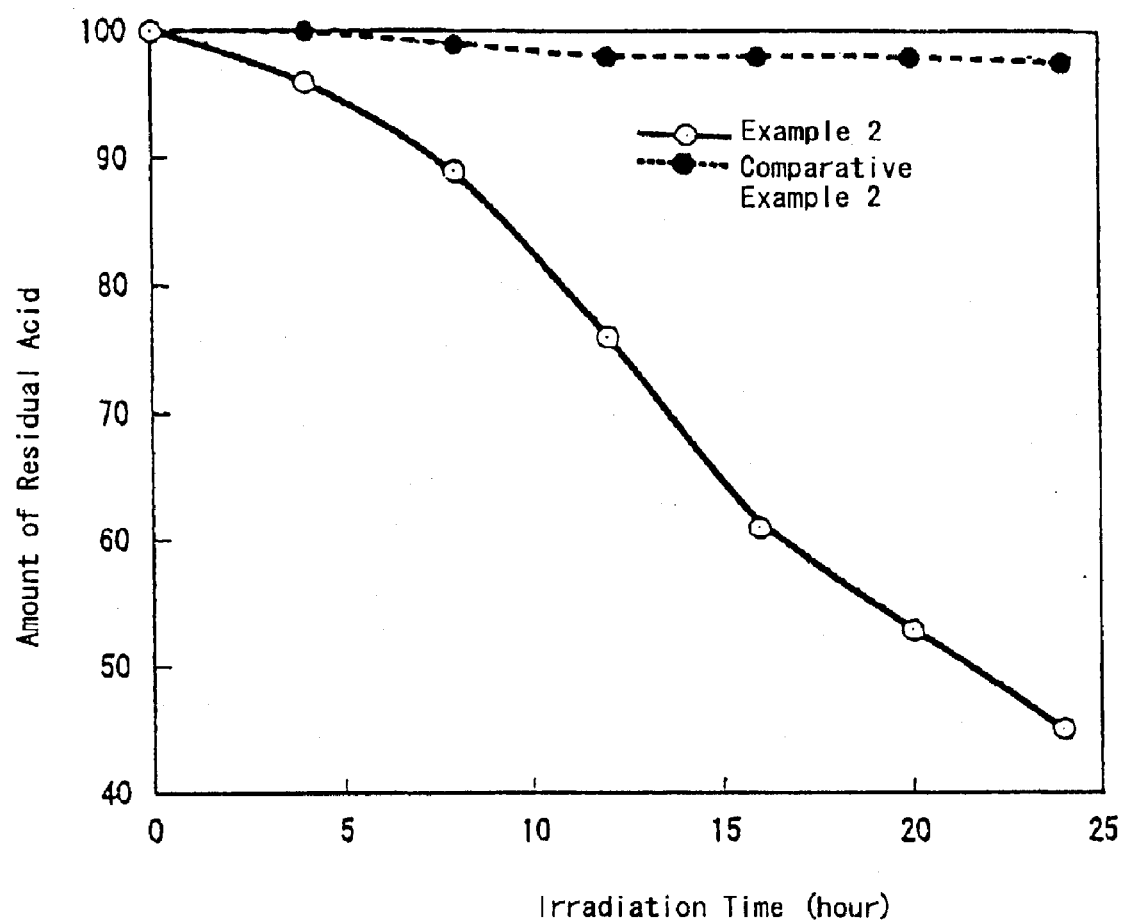
FIG. 2 is graphs showing change of concentration of perfluorooctanecarboxylic acid with irradiation time measured in Example 2 and Comparative Example 2.

The procedure of Example 2 was repeated in the same manner as described except that no photocatalyst was used. The results are shown in FIG. 2. Decomposition of trifluoroacetic acid did not occur.

EXAMPLE 3

In a 300 mL pressure-resistant reactor having a sapphire window and lined with an alumina coating, $2 \times 10^{-4}$ mole of $H_3PW_{12}O_{40} \cdot 6H_2O$ as a photocatalyst and 20 mL of water were placed, while 0.2 g of a tetrafluoroethylene-hexafluoropropylene copolymer (weight average molecular weight as measured by gel permeation chromatography: 5,100) was charged in a holder provided in an upper portion of the inside of the reactor. Carbon dioxide (140 g) was then added into the reactor so that the inside pressure in the vessel was 5.7 MPa at 20° C. Oxygen gas was then fed to the reactor until a total pressure of 6.2 MPa was reached inside the reactor. Upon stirring using a magnetic stirrer, the tetrafluoroethylene-hexafluoropropylene copolymer in the holder was gradually mixed into the aqueous solution and the mixture in the reactor was heated to 40° C. so that the pressure was increased to 9.8 MPa. Then, the mixture was irradiated through the window with light of a high pressure mercury lamp (500 W) for 24 hours. After reducing the pressure in the reactor to ambient pressure, the solids in the reactor were collected. The amount of the solids was found to be 0.07 g. The gel permeation chromatography revealed that the weight average molecular weight of the solids was 2520, indicating that tetrafluoroethylene-hexafluoropropylene copolymer was catalytically decomposed by irradiation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of decomposing a fluorine-containing organic material, comprising irradiating a mixture of an aqueous phase containing a photocatalyst with the fluorine-containing organic material with light in the presence of an oxygen source, wherein said fluorine-containing organic material is at least one water-soluble fluorine-containing compound having 1 to 5 carbon atoms.

2. A method as claimed in claim 1, wherein said water-soluble fluorine-containing compound is selected from the group consisting of fluoroalkylcarboxylic acids, fluoroalkylsulfonic acids, fluoroalcohols and mixtures thereof.

3. A method as claimed in claim 1, wherein said photocatalyst is a metal complex showing an absorption band at a UV to visible light region, said absorption being attributed to charge transference between the metal and a ligand of said complex.

4. A method as claimed in claim 1, wherein said photocatalyst is a heteropolyacid.

5. A method as claimed in claim 1, wherein said fluorine-containing compound is decomposed by irradiation with said light to form fluorine ions, and wherein said aqueous phase is contacted with calcium ions to precipitate and recover said fluorine ions as calcium fluoride.

6. A method of decomposing a fluorine-containing organic material, comprising irradiating a mixture of an aqueous phase containing a photocatalyst with the fluorine-containing organic material with light in the presence of an oxygen source, wherein said fluorine-containing organic material is insoluble in water and is contained in a carbon dioxide phase in a liquid or supercritical state, and wherein said aqueous phase and the carbon dioxide phase are mixed with each other with stirring to form a mixed phase which is irradiated with said light.

7. A method as claimed in claim 6, wherein said fluorine-containing material has a molecular weight of at least 400.

8. A method as claimed in claim 7, wherein said fluorine-containing material is at least one compound selected from the group consisting of fluoroalkylcarboxylic acids, fluoroalkylsulfonic acids, fluoroalcohols, poly(tetrafluoroethylene), fluorovinylidene-trifluorochloroethylene copolymers, fluorovinylidene-hexafluorooropylene copolymers, and tetrafluoroethylene-hexafluoropropylene copolymers.

9. A method as claimed in claim 6, wherein said photocatalyst is a metal complex showing an absorption band at a UV to visible light region, said absorption being attributed to charge transference between the metal and a ligand of said complex.

10. A method as claimed in claim 6, wherein said photocatalyst is a heteropolyacid.

11. A method as claimed in claim 6, wherein said fluorine-containing organic material is decomposed by irradiation with said light to form fluorine ions, and wherein said aqueous phase is contacted with calcium ions to precipitate and recover said fluorine ions as calcium fluoride.

* * * * *

UNITED STATES PATENT AND TRADEMARK OFFICE
CERTIFICATE OF CORRECTION

PATENT NO.    : 6,875,902 B2
DATED         : April 5, 2005
INVENTOR(S)   : Hori et al.

It is certified that error appears in the above-identified patent and that said Letters Patent is hereby corrected as shown below:

Column 6,
Lines 25-26, change "fluorovinylidene-hexafluorooropylene" to
-- fluorovinylidene-hexafluoropropylene --.

Signed and Sealed this

Twenty-first Day of March, 2006

JON W. DUDAS
*Director of the United States Patent and Trademark Office*